United States Patent [19]

Haesters

[11] Patent Number: 4,537,115
[45] Date of Patent: Aug. 27, 1985

[54] VENTILATION ARRANGEMENT FOR A TAILGATE

[75] Inventor: Hermann Haesters, Pulheim, Fed. Rep. of Germany

[73] Assignee: Ford Motor Company, Dearborn, Mich.

[21] Appl. No.: 618,284

[22] Filed: Jun. 7, 1984

[30] Foreign Application Priority Data

Jul. 20, 1983 [DE] Fed. Rep. of Germany ....... 3326030

[51] Int. Cl.³ .............................................. B60H 1/24
[52] U.S. Cl. ............................... 98/2.18; 98/DIG. 10
[58] Field of Search ............... 98/2, 2.18, 87, DIG. 10

[56] References Cited

U.S. PATENT DOCUMENTS 3,670,640  6/1972  Götz ...................................... 98/2.18
3,952,823  4/1976  Hinderks ............................... 98/2.18

FOREIGN PATENT DOCUMENTS 1905840 11/1971 Fed. Rep. of Germany .
1430918  6/1972 Fed. Rep. of Germany .
1924014  5/1977 Fed. Rep. of Germany .
55-79952 6/1980 Japan ............................ 98/DIG. 10

*Primary Examiner*—Harold Joyce
*Attorney, Agent, or Firm*—Daniel M. Stock; Clifford L. Sadler

[57] ABSTRACT

The invention relates to a ventilation arrangement for a hinged motor vehicle tailgate, the arrangement having air-inlet openings disposed in the region of a tailgate frame member and air-outlet openings discharging into the gap between the tailgate and the surrounding opening in the bodywork. An upper and/or lateral tailgate frame member is provided with a recessed portion which extends along an edge of the frame member. An air guiding insert is disposed within the recessed portion an air-guiding insert of which the inner contour is shaped to fit within the recessed portion and of which the outer contour lies flush with the tailgate frame member and is engageable by the door seal.

7 Claims, 4 Drawing Figures

VENTILATION ARRANGEMENT FOR A TAILGATE

BACKGROUND OF THE INVENTION

1. Field of Invention

The invention relates to a ventilation arrangement for a hinged motor vehicle tailgate, the arrangement having air-inlet openings disposed in the region of a tailgate frame member and air-outlet openings discharging into the gap between the tailgate and the surrounding opening in the bodywork.

2. Description of the Prior Art

German Patent document No. DE-A-1430918 discloses a ventilation arrangement for motor vehicles, which is formed on a hinged tailgate. Internal air-outlet openings are formed in certain areas of the frame of the tailgate.

This known ventilation arrangement has the disadvantage that the air is guided directly through the cavities of the tailgate, formed as a sheet metal component, and the external air-inlet openings are unprotected on the surface of the bodywork of the motor vehicle.

German Patent document No. DE-B-1905840 discloses a further ventilation arrangement for a motor vehicle which is formed on the frame of the opening for a hinged tailgate which frame is provided with a special water drainage tank. The drainage tank is U-shaped in cross-section and lateral air-inlet openings discharge into it. The air-outlet openings of the arrangement are provided with air-guiding nozzles which discharge into the sealed-off gap between the tailgate and the surrounding opening in the bodywork.

This known ventilation arrangement has the disadvantage that the arrangement of the water tank requires considerable structural expenditure and, in addition, the air is not guided to flow in the immediate vicinity of the windows, as desired.

Germand Patent document No. DE-A-1924014 discloses a further ventilation arrangement for a motor vehicle which is likewise formed on a hinged tailgate. Internal air-inlet openings and air-outlet openings which discharge into the area of the bodywork gap are provided in the region of the tailgate frame member and the air again is guided directly into the cavities of the tailgate, constructed in the form of a pressed sheet metal part.

Although this known ventilation arrangement allows air to be guided in the immediate area of the rear window and also permits the air-outlet openings to be covered so as to protect them against percolating and sprayed water, the guiding of air through the cavity of the pressed sheet metal part results in the moisture of the ventilation air extracted from the passenger compartment leading to increased corrosion in the cavity of the pressed sheet metal part.

SUMMARY OF THE INVENTION

The present invention seeks to provide an improved ventilation arrangement for a motor vehicle tailgate which ensures a convenient guiding of air in the region of the windows, permits lower structural and assembly expenditure, and mitigates the drawbacks of guiding air through the cavities of a pressed sheet metal part.

According to the present invention, there is provided a ventilation arrangement for a hinged motor vehicle tailgate, the arrangement having air-inlet openings disposed in the region of a tailgate frame member and air-outlet openings discharging into the gap between the tailgate and the surrounding opening in the bodywork, wherein an upper and/or lateral tailgate frame member is provided with a recessed portion which extends along an edge of the frame member, there being disposed within the recessed portion an air-guiding insert of which the inner contour is shaped to fit within the recessed portion and of which the outer contour lies flush with the tailgate frame member and is engageable by the door seal.

By virtue of the above construction, it is possible to guide the air in the immediate vicinity of the windows, thus preventing the moist air from the passenger compartment from penetrating into the cavities of the pressed sheet metal part.

Conveniently, labyrinth-like ribs and air-permeable but sound-absorbing foam devices may be provided in the air-guiding duct defined by the insert, so that penetration of sprayed water and of noise may be reliably prevented.

BRIEF DESCRIPTION OF THE DRAWINGS

The invention will now be described further, by way of example, with reference to the accompanying drawings, in which.

DESCRIPTION OF THE PREFERRED EMBODIMENTS

Figure 1:
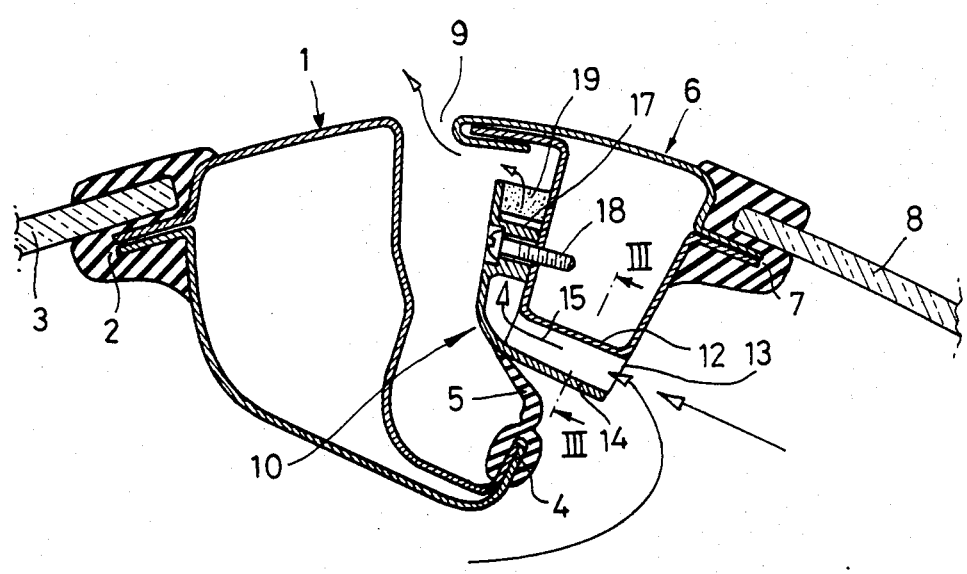
FIG. 1 is a section through the surrounding opening and a tailgate frame member of a hinged tailgate.

In FIG. 1, the so-called D-pillar of a motor vehicle bodywork is designated 1 and defines on one side an opening 2 for a side window 3, and on the other side an opening 4 with an attached door seal 5 for a hinged tailgate. The tailgate may be in the form of a pressed sheet metal part and in the upper area of its frame defines an opening 7 for a backlight 8. As is usual, a gap 9 in the bodywork sealed off from the interior of the vehicle by the door seal 5 is present between the D-pillar 1 and the tailgate.

Figure 2:
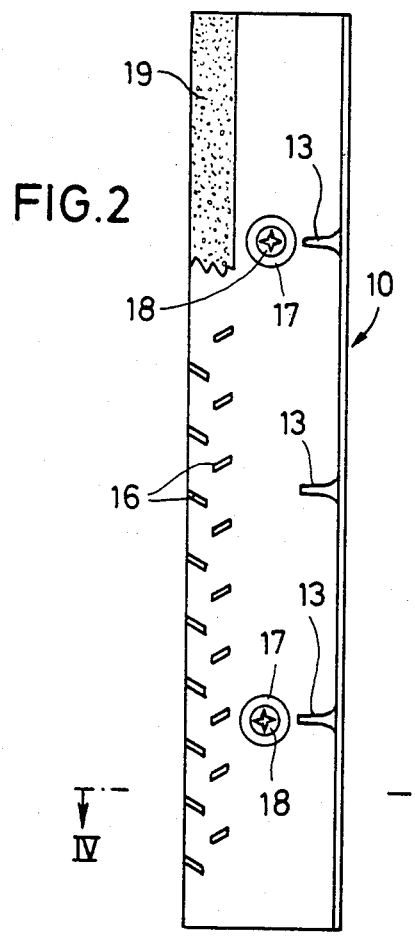
FIG. 2 is a view of an air-guiding insert viewed in the attachment direction.
Figure 3:
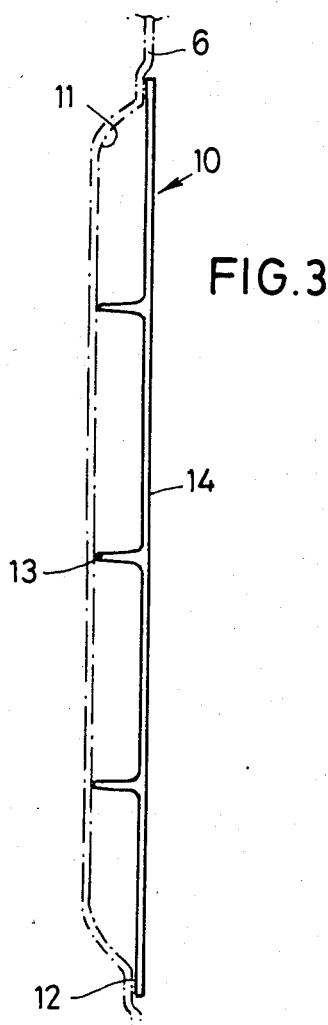
FIG. 3 is a section along the line III—III in FIG. 1.
Figure 4:
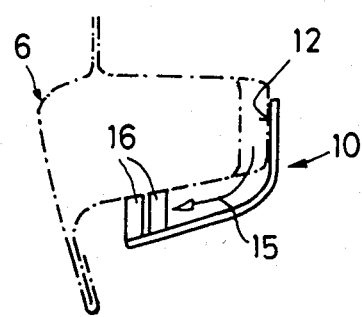
FIG. 4 is a section along the line IV—IV in FIG. 2.

Air-guiding inserts 10, the design of which will presently be explained in greater detail with reference to FIGS. 2 to 4, are disposed in the upper and/or lateral area between the door seal 5 and the tailgate.

Referring to FIG. 3, one air-guiding insert 10 is shown disposed in the region of a tailgate frame member 6, the tailgate frame member 6 being provided with a recessed or sunk-in portion 11 which extends along the length of the tailgate frame member 6. The air-guiding insert 10 has, in the plane of the door seal 5, an internal contour in the form of abutment surfaces 12 and support ribs 13, by which it is sealed and supported in the sunk-in portion 11, while its external contour 14 continues the course of the tailgate frame member 6 in a complementary manner and cooperates with the door seal.

The preferred air-guiding inserts 10 are provided with an angled air-guiding duct 15, whose area lying in the plane of the tailgate seal 5 is supported on the tailgate frame member 6 by the support ribs 13 and whose area lying in the gap 9 in the bodywork is supported by way of fastening screws 18 disposed in corresponding sockets 17. The inserts 10 may alternatively be held in position by means of sealing and adhesive strips provided on the abutment surfaces 12 of the inserts 10.

The air-guiding inserts 10 may be provided with a plastic strip such as the foamed material shown at 19 of air-permeable and sound-absorbing material arranged upstream of labyrinth-like ribs 16 or, as an alternative, instead of the ribs 16.

The air-guiding insert 10 may furthermore be provided on its inner contour, closely hugging the sunk-in portion, with appropriate sealing strips which prevent noise, and may be suitably adapted in appearance on its outer contour to the adjacent tailgate frame member.

What is claimed is:

1. A ventilation arrangement for a hinged motor vehicle tailgate, the arrangement having air-inlet openings disposed in the region of a tailgate frame member and air-outlet openings discharging into the gap between the tailgate and the surrounding opening in the bodywork of the motor vehicle, wherein portions of a tailgate frame member are provided with a recessed portion which extends along an edge of the frame member, there being disposed within the recessed portion an air-guiding insert of which the inner contour is shaped to fit within the recessed portion and of which the outer contour lies flush with unrecessed portion of the tailgate frame member and is engageable by a door seal.

2. A ventilation arrangement according to claim 1, wherein the air-guiding insert comprises an angled air-guiding duct which is supported on the sides of the tailgate frame member by way of support ribs in the region of the plane of the door seal and by way of air-permeable spacer means in the region of the gap in the bodywork.

3. A ventilation arrangement as claimed in claim 2, wherein the air permeable spacer means comprises a plurality of ribs arranged in the form of a labyrinth.

4. A ventilation arrangement according to claim 2, wherein the air permeable spacer means comprises a foam strip of air permeable, sound-absorbing material.

5. A ventilation arrangement according to claim 3, wherein the air permeable spacer means further comprises a foam strip of air permeable, sound-absorbing material positioned in a region upstream of said ribs.

6. A ventilation arrangement according to claim 1, wherein the air-guiding insert is secured directly to the tailgate frame member by way of appropriate sockets and fastening screws.

7. A ventilation arrangement according to claim 1, wherein the air-guiding insert is secured by adhesion directly to the tailgate frame member by way of sealing and adhesive strips provided on the abutment surfaces of the insert.

* * * * *